Patented Mar. 26, 1935

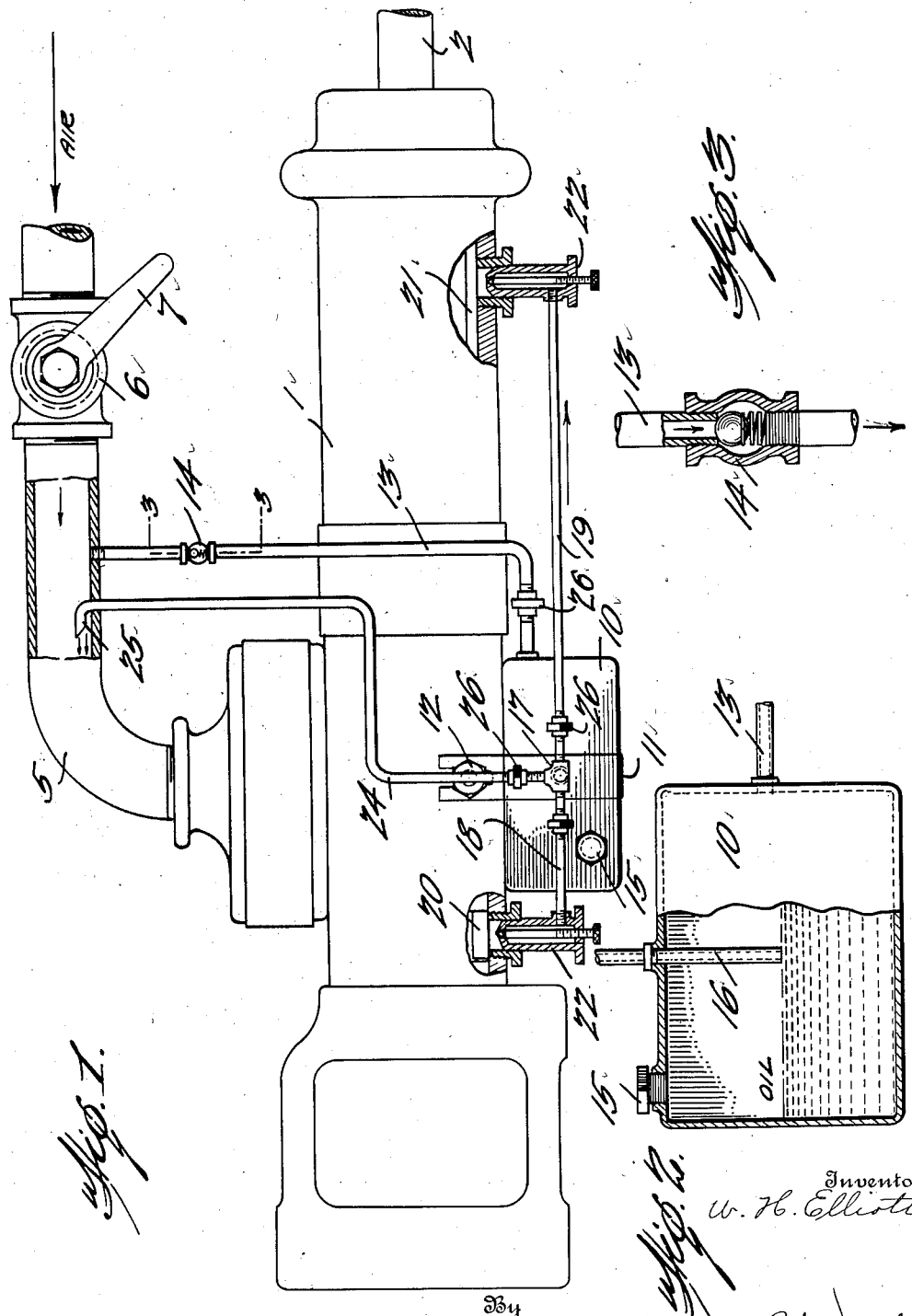

1,995,736

UNITED STATES PATENT OFFICE 1,995,736

LUBRICATOR FOR ROCK DRILLS

Walton H. Elliott, Port Arthur, Tex., assignor to The Texas Company, New York, N. Y., a corporation of Delaware Application August 7, 1930, Serial No. 473,682

4 Claims. (Cl. 184—55)

My invention relates to lubricators for fluid-actuated machines, such as rock drills, pneumatic tools or other machines which it is desired to lubricate automatically or with a minimum of attention from the operators who are usually unskilled laborers.

One object of my invention is to insure proper lubrication of a compressed-air drill or similar tool through the medium of the pressure fluid employed to operate the machine with a simple, rugged device which is cheap to manufacture and well adapted to withstand the rough usage to which such machines are subjected.

Another object of my invention is to provide a device of the character indicated which will function properly in any position of the tool because when a rock drill is used in mining, for example, the drill may be directed either upwardly, downwardly or to one side.

A still further object of my invention is to provide a detachable lubricant container for a rock drill or similar tool which may be applied to an old tool as readily as it is embodied in the construction of a new tool. A detachable lubricant container is particularly advantageous in that the same may be filled at the storehouse where the drills are kept and issued with the drills, thus insuring a proper supply of lubricant at all times and facilitating the keeping of records relative to the amount of lubricant used.

In rock drills and similar pneumatic tools, it is essential that sufficient lubricant be supplied to the tool but an excessive amount of lubricant is not only wasteful but causes the action of the tool to become sluggish. It has been found desirable to use oil or a light grease as the lubricant in place of the heavier grease heretofore employed and, in general terms, it is the object of my invention to provide an improved lubricator utilizing oil or light grease to obtain effective and economical lubrication of machines of the character described.

Other objects and advantages of my invention will appear from consideration of the following detailed description of the embodiment thereof shown in the accompanying drawing, wherein Fig. 1 is an elevational view of the improved lubricator as applied to a rock drill, parts being broken away for the sake of clearness; and Figs. 2 and 3 are detail views of the lubricant container and check valve.

Referring to the drawing, a pneumatic rock drill 1 provided with a drill or other tool 2 is shown conventionally. The rock drill or tool is adapted to be operated by compressed air, the pressure line being indicated at 5. The compressed air line 5 is provided with a valve 6 having the usual handle 7 for manual control. The rock drill forms no part of the present invention except as hereinafter described, and the showing in the drawing may be considered illustrative of any fluid-actuated machine or tool of this general character.

A lubricant container or receptacle 10 is detachably secured to the casing of the drill as, for example, by means of a strap 11 engaged by a clamp or bolt 12 threaded into the casing. Any suitable means for securing the lubricant container in position may be employed. A conduit or connection 13 extends between the container 10 and the pressure line 5 whereby when the valve 6 is opened, the lubricant in the container is placed under pressure. A check valve 14, the detailed construction of which is shown in Fig. 3, may be provided in the conduit 13 to prevent leakage of the oil from the container 10.

The lubricant container 10 is also provided with a removable stopper or plug 15 permitting the refilling of the container. An outlet pipe or conduit 16 extends into the container 10 so that the inlet opening in said conduit is substantially at the center of the container. The conduit 16 is provided with a connection 17 communicating with distributing conduits 18 and 19 extending to the parts 20 and 21 of the drill to be lubricated. The parts 20 and 21 may be the valve mechanism and the reciprocating piston of the drill, for example. The quantity of lubricant fed to the drill may be regulated by needle valves 22, or orifices of such size as to admit the proper quantity of lubricant may be substituted for these valves.

A third distributing conduit 24 may also be provided to supply lubricant to an orifice 25 in the pressure line 5 whereby the air supplied to the tool may be employed as a medium for effecting lubrication of the tool. It will be understood that the flow of air in the pressure line past the orifice 25 produces a suction upon the oil in the lubricant container 10 and a small quantity of lubricant is admixed with the air in the pressure line. Detachable couplings or unions 26 are provided in the conduits connected to the lubricant container 10, as indicated, to permit the container to be removed from the tool.

It will be apparent that the construction described provides for forced feed of lubricant to the parts 20 and 21 within the casing of the drill as well as for the admixture of lubricant with the entering air. The container 10 is normally kept substantially filled with lubricant and by reason of the location of the inlet opening in the conduit 16 at the center of the lubricant container, a supply of lubricant will be fed through the distributing conduits irrespective of the position of the drill until the oil level reaches that shown in the drawing. The drill may thus be operated in a vertical, horizontal or inclined position without affecting the operation of the lubricator.

The lubricator is particularly designed for use in connection with drills or other tools operated by unskilled laborers. For this reason, the feeding of the lubricant is entirely automatic and does not depend upon the operator. The lubricator is intended to use an oil or light grease instead of the heavier grease heretofore employed and is adapted to provide effective lubrication without wasting lubricant.

The lubricant container 10 may be readily applied to old drills or may be embodied in the construction of a new drill. When the lubricator is used in connection with mining operations, in which the miners work in shifts, it is desirable to remove the lubricant container 10 at the end of each shift and return the same to the storehouse. It is thus possible to keep a record of the amount of lubricant employed and if each miner is issued a full container at the beginning of a shift, the danger of injury of a drill through failure of lubrication is substantially eliminated.

Various modifications in the construction and arrangement of the parts of the lubricator may be made without departing from the scope of the present invention as defined by the appended claims.

I claim:

1. In a lubricator for a compressed-air tool having a pressure line connected thereto, a lubricant container, means for detachably securing said container to the tool, a connection from said container to the pressure line for placing the lubricant under pressure and means for feeding lubricant to the parts to be lubricated, said last-mentioned means including a conduit having one end extending into and terminating at the center of the container and constantly immersed in the lubricant when the container is more than half full whereby proper lubrication is assured in any position of the tool.

2. In a lubricator for a compressed-air tool, a lubricant container on the tool, means for placing the lubricant in said container under pressure and a conduit from said container to the parts of the tool to be lubricated, said conduit having its inlet opening at the center of the container and constantly immersed in the lubricant when the container is more than half full whereby proper lubrication is assured in any position of the tool.

3. In a lubricator for a compressed air tool, a lubricant container on said tool, and an outlet conduit having one end extending into and terminating at the center of said container so that said end is at all times and in any position of the tool immersed in the lubricant in said container when the container is more than half full.

4. A lubricator for a compressed air operated machine having a pressure supply line connected thereto, comprising a receptacle attached to said machine, means for placing the liquid in said receptacle under pressure comprising a conduit connecting said receptacle with said pressure line, and a second conduit, one end of said second conduit being connected to said machine and the other end terminating at the center of said receptacle, the arrangement being such that the latter end of said second conduit will be constantly immersed in said liquid when the receptacle is more than half full so that liquid will be delivered to said machine when the machine is in any position.

WALTON H. ELLIOTT.